(12) United States Patent
Smithies et al.

(10) Patent No.: US 7,379,881 B2
(45) Date of Patent: May 27, 2008

(54) METHOD AND SYSTEM FOR RECORDING EVIDENCE OF ASSENT

(76) Inventors: Christopher Paul Kenneth Smithies, 18 Pine Road, Corfe Mullen, Wimbone (GB) BH21 3DW; Jeremy Mark Newman, 11 Sheppards Barton, Frome, Somerset (GB) BA11 1EL ( * ) Notice: Subject to any disclaimer, the term of this patent is extended or adjusted under 35 U.S.C. 154(b) by 1200 days.

(21) Appl. No.: 09/805,196

(22) Filed: Mar. 14, 2001

(65) Prior Publication Data

US 2002/0031209 A1 Mar. 14, 2002

(30) Foreign Application Priority Data

Sep. 14, 2000 (GB) ................... 0022498.0

(51) Int. Cl.
*G06Q 10/00* (2006.01)
(52) U.S. Cl. ............................... 705/1; 705/1
(58) Field of Classification Search .............. 705/1
See application file for complete search history.

(56) References Cited

U.S. PATENT DOCUMENTS

| | | | |
|---|---|---|---|
| 4,872,848 A | 10/1989 | Mouissie | 439/135 |
| 5,159,180 A * | 10/1992 | Feiler | 235/375 |
| 5,544,255 A | 8/1996 | Smithies et al. | |
| 5,647,017 A | 7/1997 | Smithies et al. | |
| 5,818,955 A | 10/1998 | Smithies et al. | |
| 5,857,028 A | 1/1999 | Frieling | |
| 5,872,848 A | 2/1999 | Romney et al. | 380/25 |
| 6,064,751 A | 5/2000 | Smithies et al. | |
| 6,091,835 A | 7/2000 | Smithies et al. | |
| 6,149,440 A | 11/2000 | Clark et al. | |
| 6,401,066 B1 | 6/2002 | McIntosh | |
| 6,876,987 B2 | 4/2005 | Bahler et al. | |

FOREIGN PATENT DOCUMENTS

WO WO 9626496 A1 * 8/1996

OTHER PUBLICATIONS

Information on EasyLink, Dec. 1989.*
Leibowitz, Wendy R., "E-Signatures: Where's the Beef?" *WendyTech*, article, Nov. 14, 2000, Legal Web Works, accessed Aug. 21, 2001 <http://www.wendytech.com/articlessignature.htm>.

(Continued)

*Primary Examiner*—Naresh Vig
(74) *Attorney, Agent, or Firm*—Wilmer Cutler Pickering Hale and Dorr LLP

(57) ABSTRACT

A system and method for recording the evidence of intent of a party to a transaction, archiving this speech recording, and notifying and making it available to interested parties. A party seeking an affirmation will send to the affirming party a communication outlining the terms of the affirmation to be made, and also a transaction identifier by which a system may identify the parties to the transaction. The affirming party communicates with the system. The affirming party communicates the transaction identifier, and subsequently recites a spoken affirmation which is recorded by the system. The system then stores the recording in association with a recording identifier which can be used later to retrieve the recording. Finally, the system communicates the recording identifier both to the affirming party and to the party requesting the affirmation. The requesting party is thus informed that the affirmation has been made.

17 Claims, 10 Drawing Sheets

OTHER PUBLICATIONS

"Tax Filing Alternatives Grow in Popularity", *National Tax Services, Inc.*, IRS News Release #IR-93-17, Feb. 10, 1993, accessed Aug. 21, 2001, <http://unclefed.com/Tax-News/1993/Nr93-17.htm>.

"Alternative Ways of Doing Business", *National Tax Services, Inc..*, IRS Fact Sheet #FS-93-6, Dec. 1993, accessed Aug. 21, 2001, <http://unclefed.com/Tax-News/1993/Nrfs93-6.htm>.

"Tax Administration: Continuing Problems Affect Otherwise Successful 1994 Filing Season", *General Government Division*, report, Oct. 7, 1994, accessed Aug. 21, 2001, <http://www.unclefed.com/GAOReports/gao95-5.htm>.

LeJeune, Michelle, "Filing Taxes Electronically Easier But Still Has Bugs", article, 1998, Boulder County Business Report, accessed Aug. 21, 2001, <http://www.bcbr.com/dec98/etax2.htm>.

"Artic Web Delivers On Its Promise for Secure Voice Payment Technology for m-Commerce", article, Sep. 8, 2000, Articweb, accessed Aug. 21, 2001, <http://articweb.com/news-080900.htm>.

"What is the Voice Signature Service® ?", before Mar. 2001, TradeHarbor, accessed Aug. 22, 2001, <http://tradeharbor.com/final/flash_products.htm>.

"TradeHarbor's Voice Signature Service® Tech Papers", before Mar. 2001, TradeHarbor, accessed Aug. 22, 2001, <http://tradeharbor.com/final/flash_whitepapers.htm>.

* cited by examiner

Thank you for ordering from Sturdyfurn.com!

To complete your purchase:
1. Telephone 0800 123456
2. Key (or speak) this number: 9840 1274 3478 2480
3. Read the following declaration:

Declaration

I, John Smith, confirm that I wish to purchase four green plastic garden chairs from Sturdyfurn.com at a price of £45.87 including sales tax and carriage. I authorize Sturdyfurn.com to debit my Visa account 0308 4247 3963 1884 accordingly.

4. Press # to complete, or * to re-record
5. That's it! Click "Done".

⇐ Go back    Cancel Order    Done ⇒

A recording of your declaration has been stored securely.

To retrieve a copy of this recording for your own reference, enter your e-mail address below and press the "Retrieve" button. A copy will be e-mailed to you automatically.

To retrieve it later, make a note of the recording number shown below, and press the "Later" button.

| Recording Number: | 0840 1237 4543 2129 |
| --- | --- |
| E-mail address: | js@nowhere.net |

Retrieve Now                                Later

Fig. 7                                          20

To retrieve a copy of a recorded declaration, enter the Recording Number and your e-mail address below and then press the "Retrieve" button. A copy will be e-mailed to you automatically.

Recording Number:

E-mail address:

Retrieve

Database Schemata

| Vendors (14) | | |
|---|---|---|
| Field | Index | Required |
| Vendor ID | Y | Y |
| Contact information | | Y |

| Pending Transactions (15) | | | |
|---|---|---|---|
| Field | | Index | Required |
| Transaction ID | | Y | Y |
| Vendor ID | | Y | Y |
| Expiry date/time | | | |

| Transactions (16) | | | |
|---|---|---|---|
| Field | | Index | Required |
| Transaction ID | | Y | Y |
| Vendor ID | | | Y |
| Expiry date/time | | | |
| Caller verification data | Telephone caller ID | | |
| | Voice biometric profile | | |
| Declaration text | | | |

| Callers (17) | | | |
|---|---|---|---|
| Field | | Index | Required |
| Caller ID | | Y | Y |
| Contact data | e-mail address | | |
| Caller verification data | Telephone caller ID | | |
| | Voice biometric profile | | |

| Recordings (18) | | |
|---|---|---|
| Field | Index | Required |
| ID | Y | Y |
| Caller ID | | |
| Vendor ID | | Y |
| Transaction ID | | |
| Audio data | | Y |
| Date/time | | Y |
| Expiry date/time | | |
| Declaration text | | |
| Digital Signature | | |

Fig. 9

Client-side Example in VoiceXML

```xml
<?xml version="1.0"?>
<vxml version="1.0">
  <form>
    <field name="transaction_id" type="digits">
      <prompt count="1">Please enter the contract number shown on the form.</prompt>
      <prompt count="2">You will find the contract number at the top of the form. Please enter it now.</prompt>
      <catch event="help">
          Please say or key in your 10 digit contract number.
      </catch>
      <filled>
        <if cond="transaction_id.length != 10">
          The contract number must have 10 digits.
          <clear namelist="transaction_id"/>
          <throw event="nomatch"/>
        </if>
      </filled>
    </field>
    <record name="declaration" beep="true" maxtime="10s"
        finalsilence="4000ms" dtmfterm="true" type="audio/wav">
      <prompt>
        After the tone, please read your declaration. Press the hash key to finish.
      </prompt>
      <noinput>
        I didn't hear anything, Please try again.
      </noinput>
    </record>

<field name="confirm" type="boolean">
      <prompt>
        Your declaration is <value expr="declaration"/>.
      </prompt>
      <prompt>
        To keep it, say yes. To discard it, say no.
      </prompt>
      <filled>
        <if cond="confirm">
          <submit next="save_declaration.pl" method="post" namelist="transaction_id declaration"/>
        </if>
        <clear/>
      </filled>
    </field>
  </form>
</vxml>
```

Fig. 10

METHOD AND SYSTEM FOR RECORDING EVIDENCE OF ASSENT

RELATED PATENT APPLICATION

This application claims priority of British Provisional Patent Application Number 0022498.0, filed Sep. 14, 2000, which is expressly incorporated herein by reference in its entirety.

FIELD OF INVENTION

The present invention is directed to a system and method for recording evidence of assent to a transaction in the field of computer systems for electronic and automated commerce, and more particularly, to a system and method whereby recorded evidence of a party's assent to a transaction is subsequently made available to the relying parties.

COPYRIGHT NOTICE

The disclosure herein contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

For a contract to exist between two parties, there must be, inter alia, intent to enter into reciprocal obligations, agreement as to the nature of those obligations, and assent thereto. Evidence of assent might include evidence of oral undertakings, complete or partial fulfilment of the contractual undertakings, and formal acts of signing written statements.

Historically, the greater part of commerce was conducted face-to-face. Most contracts were made orally and evidence of assent was obtained from human witnesses. Longer-range contracts would more typically be effected on paper. In this case, the affixing of a seal or a handwritten signature would constitute physical evidence of a solemn act of assent to the terms of the contract. In particularly solemn situations, an independent third party, e.g., a notary, would likewise attest his observation of the solemn act, further strengthening the evidence of assent.

With the advent of modern telecommunications, commercial entities increasingly operate on a national or international basis. In the course of their business, companies rely upon contracts with a greater number of parties, often over an ever wider geographical area. However, the development of large-scale commerce has not yet accommodated the need to gather and preserve evidence of assent to a commercial transaction. In the case of written contracts for example, evidence of assent—the handwritten signature—has typically been handled by means of the nineteenth century postal system.

In recent years, attempts have been made to address the problem of evidencing assent to commercial transactions in the electronic commerce domain. Most "online" transactions are consummated by a party clicking on an icon indicating his assent. Early attempts to address the lack of a signature have focused on the issue of the identity of the contracting party. So, for example, the so-called digital signature system relies on the association of secret information with a particular individual or entity. In order to digitally sign a message, one must be in possession of a secret encryption key. While it can be proved that a message cannot be signed without possession of the secret key, the mere existence of a digital signature does not of itself provide any evidence that the secret was not divulged or in some other way compromised. Some proponents of the digital signature system seek to strengthen it by adding a biometric check, which requires an individual to have the specific physical or behavioural attributes of the authorized signatory to gain access to the secret encryption key.

However, such attempts inevitably fail, in that they do not address the more fundamental issue of assent. Handwritten signatures function as indicators of assent because of two cultural conventions. The first is that a signature is understood to indicate assent to the preceding text of a paper document. The second is that the making of a handwritten signature is culturally associated with the undertaking of a solemn commitment. Digital signatures enjoy neither of these cultural associations. In the first place, the only association with the text of the document is a mathematical one which the signatory has no means of verifying. In the second, the sequence of actions required to perform a digital signature are not a matter of public convention, nor even of common knowledge. It would be easy for a signatory to repudiate a digital signature, either by alleging that he was ignorant of the meaning of the signed data, or denying that the steps he took to provide a digital signature expressed assent. In order to establish either of these points, therefore, a digital signature system is reliant on other, extrinsic evidence.

A quite different approach was taken by those inventors who sought to employ computer technology to gather evidence of informed consent to undergoing medical procedures. For example, in U.S. Pat. No. 5,857,028, a system is described that is equipped with speech output facilities which, having presented the affirming party with the content of the affirmation, obtained evidence of his comprehension by inducing him to answer a questionnaire by pressing appropriate keys on a computer keyboard and signify his final acceptance by giving a fingerprint sample. Another example is U.S. Pat. No. 6,149,440, which describes a similar system where the affirming party is invited to submit a digitally recorded handwritten signature. Such systems, however, can only be applied in very specialized circumstances and are ill suited to general-purpose declarations and agreements. Further, the evidential link between the interactions (such as keystrokes) of the affirming party and the "signing" act (e.g., the giving of a fingerprint sample or a digitized handwritten signature) is not self-evident, and would need to be supported by expert testimony in a forensic context. Finally, these methods cannot make the evidentiary record available to the interested parties.

In U.S. Pat. Nos. 5,544,255, 5,647,017, 5,818,955 and 6,064,751, Smithies and Newman proposed a system which sought to overcome most of these defects. The system described in the Smithies and Newman patents enabled handwritten signatures to be created in association with electronic documents and communicated within the electronic domain. The described system invited the signatory to sign in the context of a display showing a statement of the import of the message to be signed. This statement was then stored together with the signature data. The proximity of the statement of intention and the conventions surrounding the execution of a handwritten signature provided good evidence of assent to the contents of the signed message.

Subsequently, in U.S. Pat. No. 6,091,835, Smithies et al. described a system that was not restricted to the use of handwritten signatures, but could equally use speech recording, fingerprint sampling, or the input of a password or digital signature. This system sought to overcome the limitations of non-standard signing techniques by enabling prompts to be displayed to the signatory explaining the significance of what he was being asked to do. Evidence of informed consent was produced at every stage: the system logged all the prompts displayed to the signatory and all the signatory's interactions in an electronic transcript. However, the matter to be signed was necessarily expressed in digital form, as was the assent to the matter, and the two were inextricably linked.

Although the foregoing solutions attempt to provide evidence of informed consent, they suffer from severe limitations. First, they require the signatory to have access to specialized hardware. Second, they require that the signatory have special software installed on his computer. Third, they have no facility for making the evidence of assent available to the interested parties.

Their fourth and most serious shortcoming is one that is shared by all forms of electronic signing proposed to date. That is that they are bonded to a specific digital embodiment of the signed data. A conversion of the signed data from one electronic format to another (which frequently occurs as a result of software upgrades) will invalidate an electronic signature without necessarily changing the meaning of the data. This has two consequences. The first is that over the course of time, digital embodiments of documents such as contracts are apt to change. Custodians of archives of electronically signed documents are thus faced with the dilemma of either maintaining those documents in their original, archaic form or converting them to a more up-to-date form and thus invalidating the electronic signature. The second consequence is that existing electronic signing procedures cannot be used to signify acceptance of terms which are communicated by means of a paper document. They can only be used to sign something which is in digital form.

SUMMARY OF THE INVENTION

The present invention is directed to a method and system whereby a party may affirm a document, transaction or action by communicating with a recording system and recording a statement of his intention with regard to that document, transaction or action to evidence his assent. In general, the method and system may be applied in any case where a party requires reliable evidence of assent or intent by another party.

In the present invention, a recording system is primed on behalf of a relying party to expect a communication from an affirming party. When communications are established between the recording system and the affirming party, the system receives from the affirming party an identifier that identifies the document, transaction or action, and then makes a recording of an oral statement of affirmation from the affirming party. This recording is then archived and made available to interested parties, e.g., the relying and affirming parties.

The present invention could typically be used in the context of a contract of sale between a vendor and a customer. The vendor prepares a contract. The vendor then negotiates with a recording system to establish an identifier to associate the parties and the specific contract. The recording system stores this identifier, which will be used later to associate the contract with an affirming party—here, the customer.

The vendor then independently communicates to the customer a message that includes a summary of the contract of sale, the identifier and an invitation to communicate with the recording system to confirm his acceptance of the terms of the contract.

If the customer chooses to affirm the contract, he communicates with the recording system. Once communications are established between the recording system and the customer, the system prompts the customer to communicate the identifier. Once the system has received the identifier, it then prompts the customer to recite a declaration or summary statement evidencing his assent to the contract. After the recording is completed, the recording system provides the customer with a recording identifier that can be used to retrieve the recording from the archives of the system. The system also transmits a recording identifier to the relying party—here, the vendor—to notify them of the affirmation so that they too may retrieve the recording of the affirming statement. Finally, the system archives the recording for later recall in the event there is a dispute between the parties.

It will be apparent that this invention is able to address the shortcomings of all existing approaches to solemnizing a contract, while doing so in a form which is convenient to modern electronic communication and storage mechanisms. First, unlike electronic signing mechanisms, it requires no special-purpose hardware.

Second, a voice recording provides good evidence of the identity of the affirming party without the need for expert testimony. In many cases, for example, a close friend or relation can verify the identity of the speaker on the basis of the recorded statement. Alternatively, a computer biometric system can be integrated with the current invention in order to provide automatic verification of identity.

Third, the context in which an affirming party records his affirmation provides excellent evidence that he was acting with a specific intent.

Fourth, the evidentiary value of the recorded affirmation does not rely upon any particular digital embodiment of the contract or agreement being affirmed. In principle, the sound recording archived by the current invention can stand as evidence of the contract even in the absence of any digital embodiment. It is thus uniquely suitable for the electronic acceptance of offers expressed in non-digital form—for example, on paper.

Finally, the current invention offers the significant advantage that the vendor can be automatically notified of the customer's acceptance.

BRIEF DESCRIPTION OF THE DRAWINGS

FIG. 6 shows an example screen display for prompting a customer to contact the recording system 2 and make a declaration.

FIG. 7 shows an example screen displayed to the customer after a declaration has been recorded.

FIG. 8 shows an example screen displayed to a party to a transaction to facilitate the subsequent retrieval of a recording pursuant to the present invention.

FIG. 9 shows exemplary schemata of databases that may be employed by the recording system 2 of the present invention.

FIG. 10 illustrates an exemplary implementation of a client/server Internet embodiment of the present invention in VoiceXML.

DETAILED DESCRIPTION OF THE INVENTION

Figure 1:
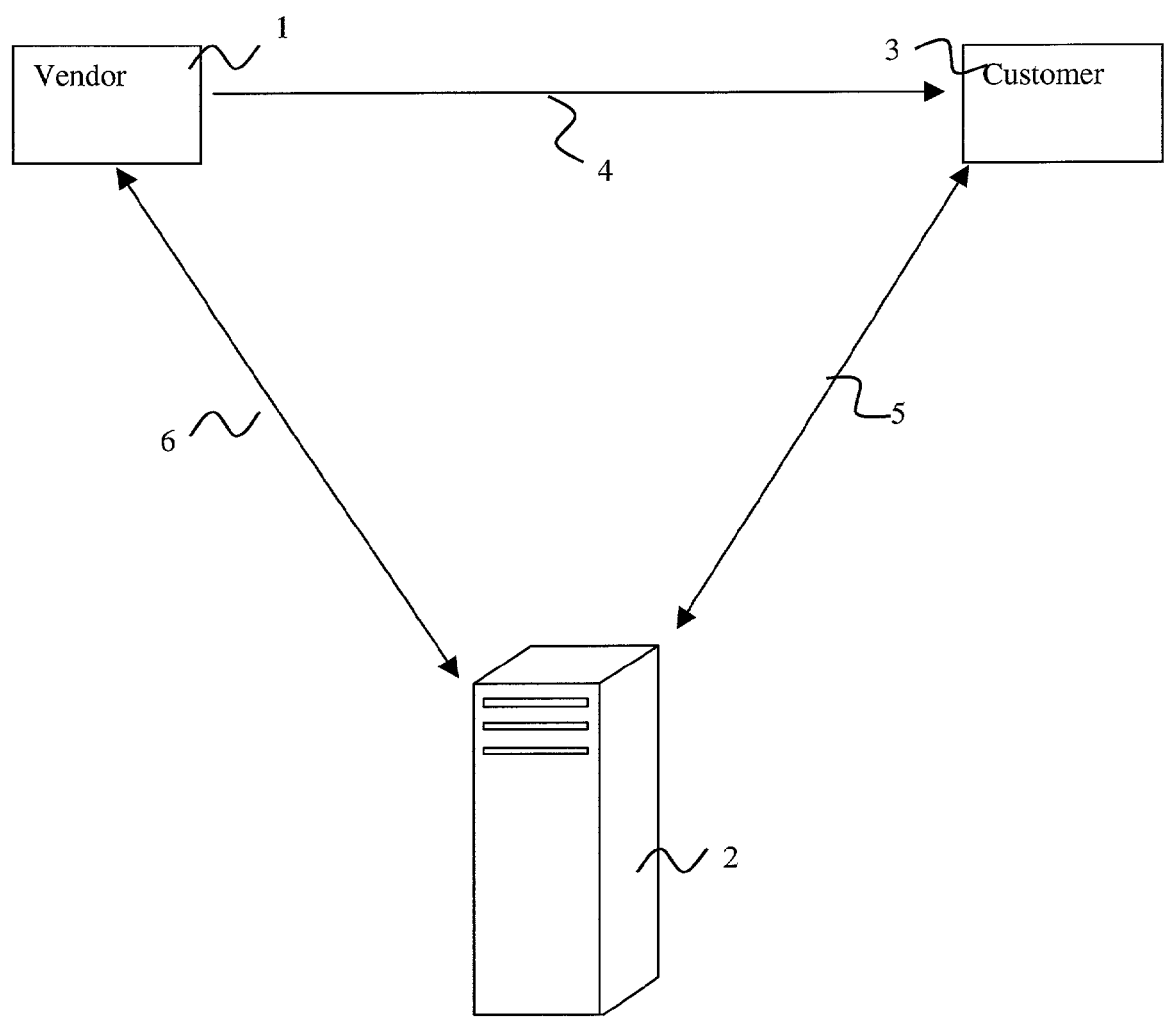
FIG. 1 is a block diagram illustrating an exemplary environment for employing the present invention.

The present invention provides a system and method for recording evidence of a party's assent to a transaction and subsequently making it available to the relying parties. As explained in more detail below, notice of the giving of assent may be transmitted to the relying parties and the evidence itself made available for access by the parties.

In the following detailed description, numerous specific details are set forth regarding the system and method and the environment in which the system and method may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same references numerals are used in the drawings and in the description to refer to the same elements to simplify the description.

For the purposes of clarity, the party requiring the declaration will be designated the "Vendor" and the party making the affirmation the "Customer". The description below is given in the context of a one-vendor, one-customer transaction. It should be understood that this is exemplary, as the system and method of the present invention are equally suited to multiple party transactions or supporting multiple independent transactions.

Referring now to the drawings, FIG. 1 illustrates an exemplary environment for carrying out the present invention. Shown in FIG. 1 are a vendor 1, a recording system 2 and a customer 3. The vendor 1 is coupled to the customer 3 by a communications link 4. The vendor 1 is also coupled to the recording system 2 by a communications link 6. Similarly, the customer 3 is coupled to the recording system 2 by a communications link 5. The communications links 4, 5 and 6 could be, for example, direct physical connections, direct leased lines, a telephone network, a local area network ("LAN"), a wide area network ("WAN"), a wireless network, the world-wide web, the Internet, an intranet, RAS, Virtual Private Network ("VPN"), direct cable connection, or any other type of interconnection that facilitates communication.

In the exemplary embodiment, the vendor 1 utilizes a computer, such as a general-purpose personal computer, which includes computer readable media, coupled through the communications links 4 and 6 to a network, such as the Internet (not shown). The recording system 2 generally comprises a well-known general-purpose computer comprising computer readable media such as hard disks and random access memory. The recording system 2 could be coupled through the communications links 5 and 6 to the Internet and the public switched telephone network (not shown), and could comprise a web server. The computer of the recording system 2 is capable of receiving and answering incoming telephone calls, decoding DTMF tones, performing programmed functions in response to the DTMF tones or voice commands, transmitting voice prompts via the PSTN, sending electronic messages via the Internet and recording voice messages. The customer 3 may be equipped either with a general-purpose personal computer that includes computer readable media, or with a standard telephone handset (not shown). The computer readable media described herein in at least some embodiments of the present invention could be a transmission.

The vendor 1 and the customer 3, when using a standard telephone handset, would typically be coupled to the recording system 2 via a public switched telephone network ("PSTN"). The handset would have the capability to send DTMF tones when buttons are pressed on the telephone keypad. The handset could be replaced by other devices, such as a mobile or WAP enabled telephone, a personal computer connected to the Internet, a Personal Digital Assistant ("PDA"), or any other type of device that is capable of sending and receiving electronic and/or voice messages, or a combination of the foregoing.

Figure 5:
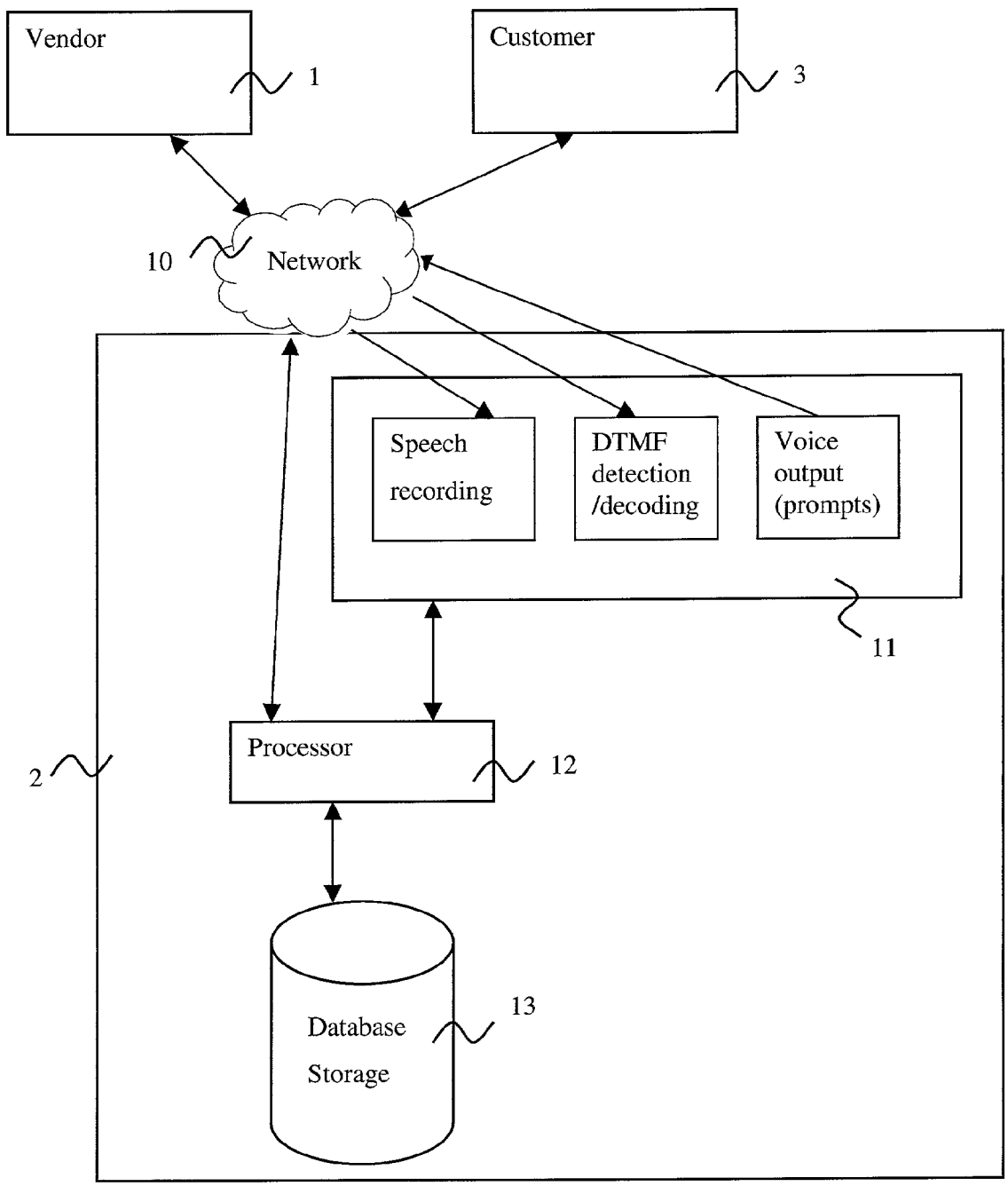
FIG. 5 illustrates, in block diagram format, elements of an exemplary embodiment of the present invention including an expanded view of the recording system 2.

FIG. 5 illustrates an exemplary embodiment of the recording system 2 in greater detail. A network link 10 enables the vendor 1 and the customer 3 to communicate with the recording system 2 via the communications links 5 and 6. A telephone interface 11 permits communication with the customer 3 via the telephone network 10. The telephone interface 11 supports the functions of speech recording, voice output (for playing pre-recorded prompts) and the decoding of DTMF tones. Such functionality is offered by a variety of readily available voice response computer interface cards. A range of suitable voice response cards, from the Dialogic® D/41 up to the D/640SC, is available from Dialogic Corporation of Parsippany, N.J. A similar range of voice cards is available from Brooktrout Technology® of Needham, Mass., from the RDSP/232 to the Vantage VRS. These cards, when operated in conjunction with well-known and commonly available software suites, offer additional functionality such as speaker-independent speech recognition. The recording system 2 also includes permanent store 13 for archiving speech recordings.

The recording system 2 generally comprises a well-known general-purpose computer with memory devices. The recording system 2 could be coupled to the Internet and the PSTN, and could comprise a web server. In an exemplary embodiment, the computer of the recording system 2 is capable of receiving and answering incoming telephone calls, decoding DTMF tones, performing programmed functions in response to the DTMF tones or voice commands, transmitting voice prompts via the PSTN, sending electronic messages via the Internet and recording voice messages.

Figure 2:
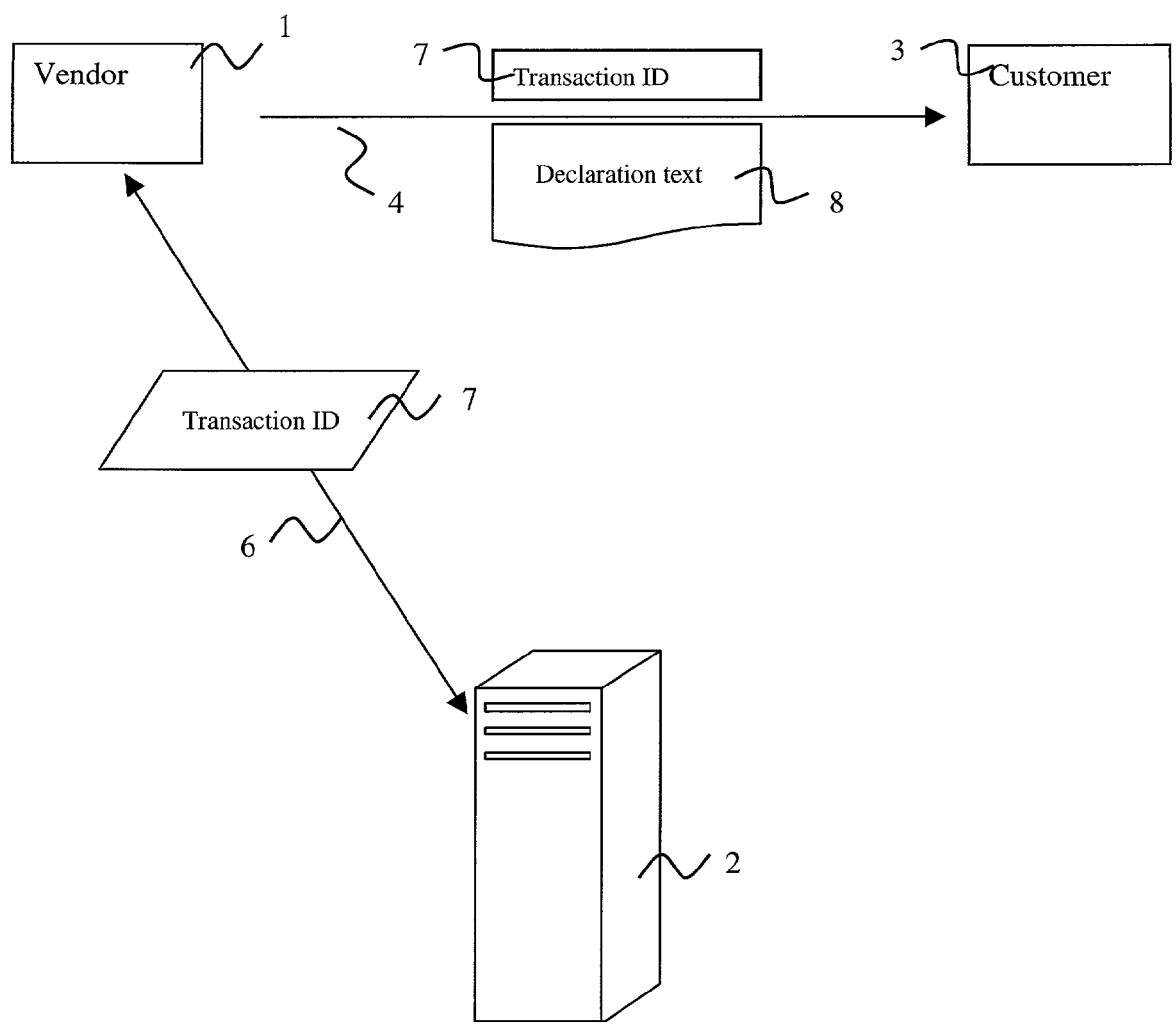
FIGS. 2-4 illustrate, in block diagram format, the flow of interaction between parties to a transaction and a recording system 2, pursuant to the present invention.

The operation of the present invention will now be more fully described with reference to FIGS. 2, 3 and 4. In its exemplary embodiment, the present invention operates in five phases.

In the first phase (not illustrated), the requesting party or vendor 1 communicates with the recording system 2 to obtain one or more transaction identifiers 7. As explained below, these identifiers are used by the recording system 2 to associate a customer 3 with a particular transaction.

In the second phase, the vendor 1 initiates a transaction by communicating a message to the recording system 2 that specifies an identification of the vendor 1, a transaction identifier 7 and (optionally) a customer identifier. The recording system 2 checks the validity of the transaction identifier 7. If the transaction identifier 7 is valid, the recording system 2 then prepares to receive an incoming communication from a customer 3 with the validated transaction identifier 7. The vendor 1 then prompts the customer 3 to communicate with the recording system 2 to complete the transaction. As illustrated in FIG. 2, the customer 3 is advised to present the transaction identifier 7 to the recording system 2 and subsequently record a declaration of assent 8. In the case of an electronic commerce transaction conducted over the Internet using a web browser, the vendor 1 might use a web page 19 such as that depicted in FIG. 6; whereas in the case of a paper transaction, essentially similar instructions can be presented on paper.

Figure 3:
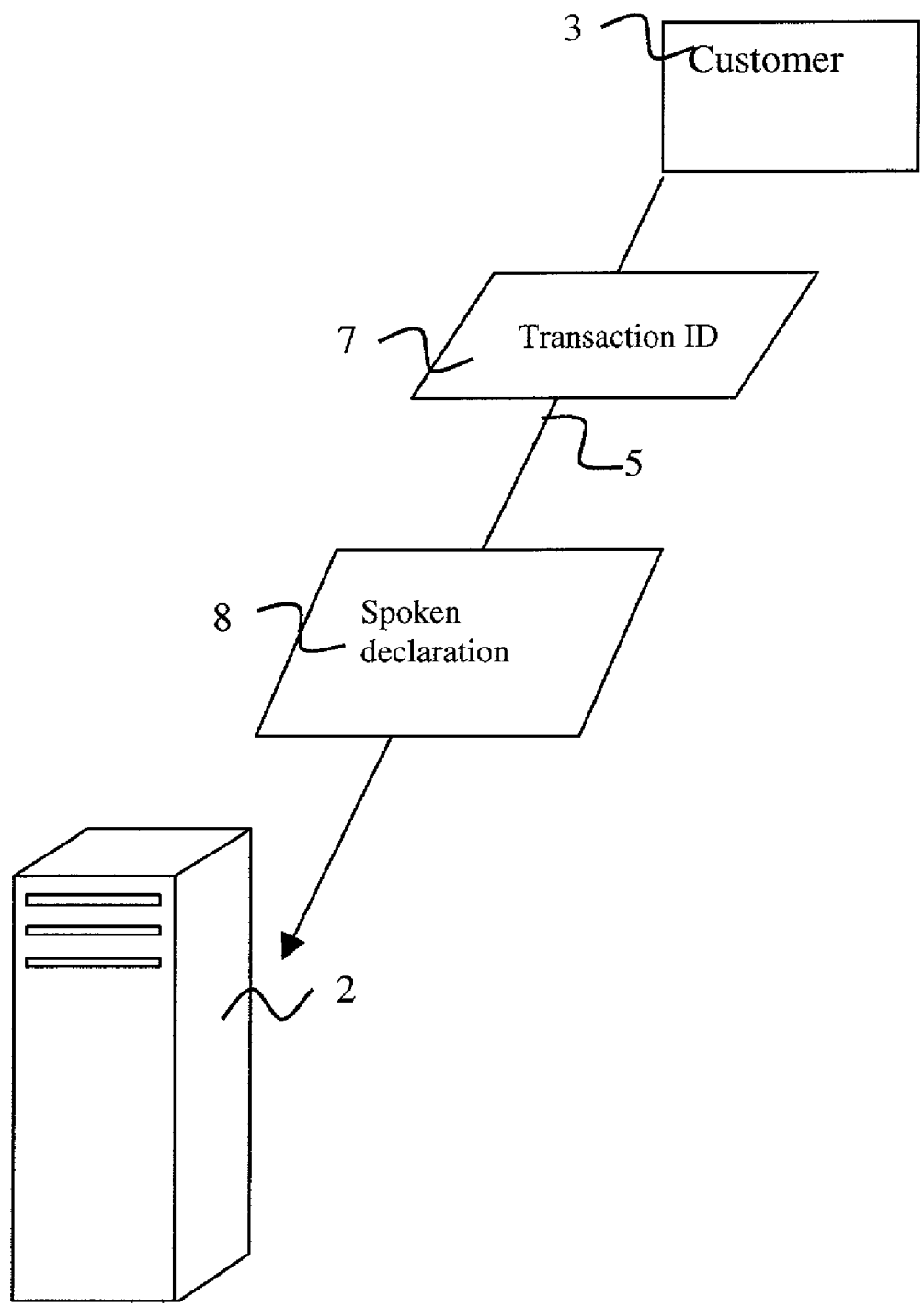

In the third phase, illustrated in FIG. 3, the customer 3 communicates with the recording system 2 to complete the transaction. First the customer 3 presents the transaction identifier 7 to the recording system 2. The recording system 2 responds to the communication by initiating a speech recording module in the speech interface module 11 (see FIG. 5). The customer 2 then records the declaration of assent 8. The customer 2 may signal the completion of the recording by pressing a touch-tone key on his telephone, or a key on his computer keyboard. Alternatively, the recording system 2 may determine the completion of the recording automatically after a period of silence has elapsed. The recording system 2 may then present the customer 3 with a menu permitting re-recording, aborting the transaction or allowing it to proceed to completion.

In an alternative embodiment, the customer 3 may participate in the third phase by using a microphone attached to the customer's 3 personal computer coupled to the Internet. In this case, the interaction with the recording system 2 will be initiated by activating a user interface component on the screen of the personal computer, or by an appropriate keystroke on the keyboard of the personal computer, or by appropriate voice-activation commands to the personal computer. Completion of the recording and subsequent interaction will likewise be indicated by a keystroke or by activating a user interface component on the personal computer screen. An example VoiceXML script to effect the client side of the third phase in a web form is shown in FIG. 10.

Figure 4:
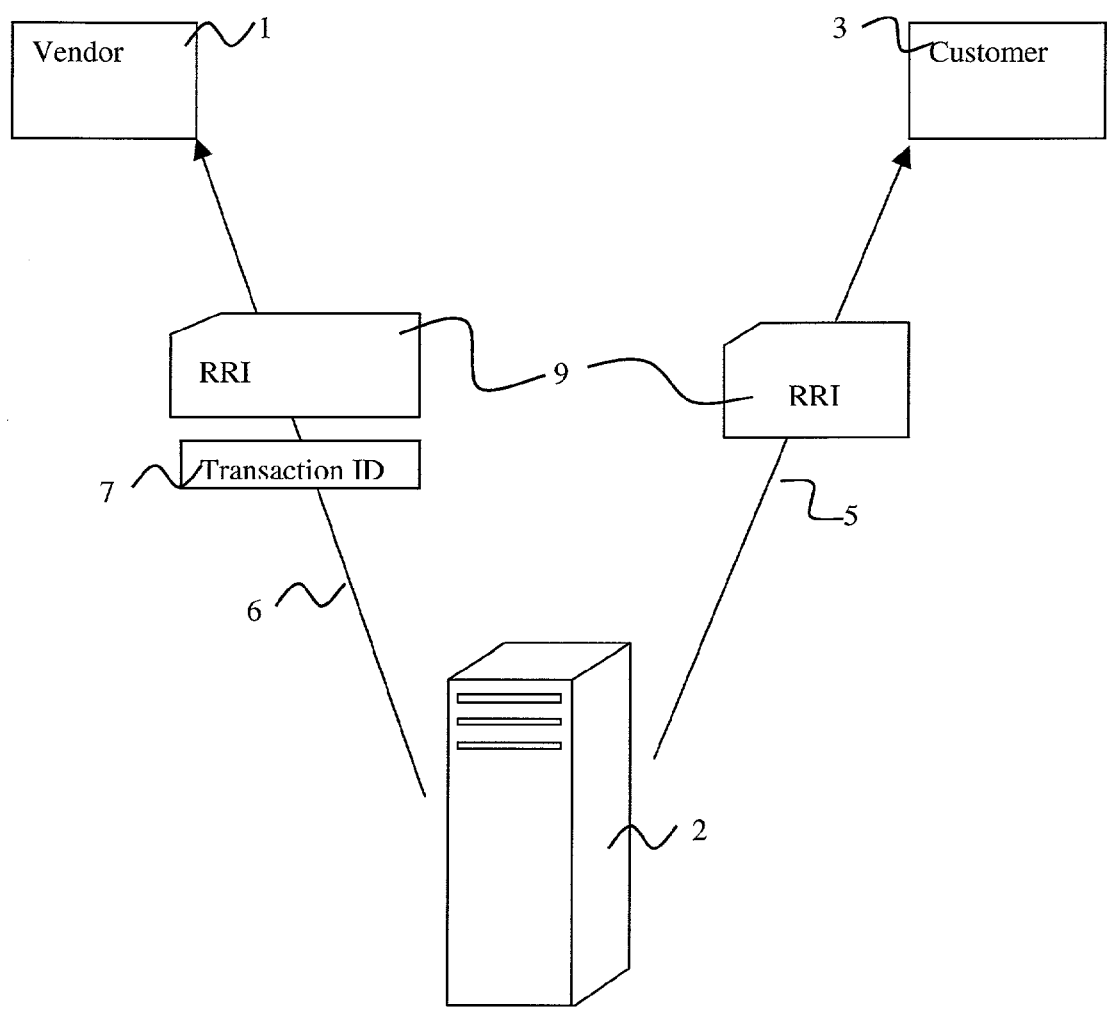

In the fourth phase, illustrated in FIG. 4, after successful completion of the recording by the customer 3, the recording system 2 stores in the permanent store 13 the digitally encoded sound recording, together with the IDs of the parties and a time-stamp. A new identifier 9 is used as an index for subsequent retrieval of the recording from the permanent store 13. This identifier 9 will be referred to as a Recording Retrieval Identifier (RRI). The recording system 2 then sends a message to the vendor 1 indicating that the customer 3 has completed the recording, and provides the RRI 9 to the vendor 1. The RRI 9 can be used by the vendor 1 to obtain a copy of the sound recording. The recording system 2 also communicates to the customer 3 an RRI 9 to retrieve a copy of the same sound recording. If the customer 3 is using an Internet enabled personal computer, the recording system 2 may present the customer 3 with a web form 20 such as that shown in FIG. 7, which gives him the option of obtaining a copy of the recording immediately, or alternatively documenting the RRI 9 to enable retrieval later. Alternatively, if the customer 3 is interacting solely by telephone, the recording system 2 will communicate the RRI 9 to the customer 3 using voice announcements.

It will be seen that the present invention informs the vendor 1 that the affirmation has taken place. It thus offers a significant advantage over previous methods of indicating formal acceptance. The combination of forensic admissibility, independent archival and instant notification makes this method particularly suitable for time-critical applications. One such application is credit-card fraud management, where the issuing company may require a formal declaration from the cardholder that he is not responsible for certain disputed transactions, before a new card may be issued.

Subsequently, in the fifth phase, an Internet message specifying the RRI 9 can be used to retrieve the archived voice recording, for example by means of a web form 21. FIG. 8 shows an example screen 21 displayed by the recording system 2 to facilitate the subsequent retrieval of a recording. It shows fields for the input of the RRI 9 and the party's e-mail address.

As discussed above, the recording system 2 includes a permanent store 13. In an exemplary embodiment, a plurality of databases is maintained in the permanent store 13 to effect the phases of operation described above. As illustrated in FIG. 9, the databases include the following.

1. A Vendor Database 14, which contains identifier and contact information in respect of each vendor, together with information about valid transaction identifiers 7.
2. A Pending Transaction Database 15, storing identifiers 7 issued to vendors but not yet activated.
3. A Transaction Database 16, providing information about each transaction to be affirmed and the parties thereto.
4. An optional Customer Database 17 exists to contain identification information about affirming parties 3, for the purpose of verifying their identity, and also to store customer contact details.
5. A Recording Archive 18, which is a database of archived voice recordings.

The five phases described above will now be described in further detail in conjunction with a description of how they interact with the plurality of databases comprised within the system.

In the first phase, the vendor 1 establishes communication with the recording system 2 to request the issuance of one or more transaction identifiers 7. The request will contain at least the following:
    identifier of the vendor 1; and
    requested quantity of transaction identifiers.
The request may also include integrity check data such as the vendor's 1 digital signature.

The recording system 2 allocates a set of transaction identifiers 7 and enters corresponding records into the Pending Transaction Database 15. It responds to the vendor 1 indicating:
    first identifier issued;
    number of identifiers issued; and
    request status (e.g., success or reason for failure).

Because the recording system 2 creates the identifiers, it can prevent conflicts between sets of identifiers used by different vendors 1. The vendor 1 may then associate each identifier with a customer 3.

In the second phase, the vendor 1 initiates the process by communicating with the recording system 2 by, for example, transmitting an Internet message to the recording system 2. This communication will contain at least the following information:
    identifier of the vendor 1; and
    transaction identifier 7 granted to the vendor 1.
The message may also contain:
    an identifier of the customer 3;
    biometric verification information;
    information as to the content of the affirmation; and
    integrity check data such as the vendor's 1 digital signature.

The recording system 2 will then consult the Vendor Database 14 to verify the vendor's 1 access, and the Pending Transaction Database 15 to verify the transaction identifier 7. To be valid, the requested transaction identifier 7 must be present in the Pending Transaction Database 15. If it is not valid, the recording system 2 will send an error response to the vendor 1. Otherwise, the recording system 2 will delete the record from the Pending Transaction Database 15 and then enter a new record into the Transaction Database 16. The vendor's 1 identifier provides a link to the appropriate record of the Vendor Database 14. This record will be retrieved when the customer 3 affirms.

When the customer 3 contacts the recording system 2, he is invited to enter the transaction identifier 7. The customer 3 may contact the recording system 2 in a number of different ways. In one embodiment, the recording system 2 receives a voice telephone call. The recording system 2 automatically answers it and prompts the customer 3 to enter the transaction identifier 7, for example by using the telephone keypad to generate DTMF tones, or by saying the transaction identifier 7. In another embodiment, the recording system 2 is contacted over the Internet 10 via a web browser, and the customer 3 is prompted to enter the transaction identifier 7 into a form displayed by a web browser.

In both cases, the recording system 2 then invites the customer 3 to record a statement of affirmation 8. The speech is recorded either via the telephone system or via a microphone attached to the customer's 3 Internet device. The customer 3 may indicate that the recording is complete by sending a DTMF signal in the case of telephone access, or by activating a control, e.g., clicking an icon or a hyperlink, on the web page in the case of Internet access. The recording system 2 may give the customer 3 the option of confirming the recording, re-recording it, or abandoning the process. In the latter event, the recording system 2 simply discards the recording. If, however, the customer 3 confirms the recording, then a new record is entered into the Recording Archive 18. This record contains the voice recording itself and also vendor identification information obtained from the Transaction Database 16. The new record is indexed with a Recording Retrieval Identifier 9 which can be used to retrieve the recording, and signed with a digital signature to prevent any alteration.

This RRI 9 is communicated to the customer 3. In the case of telephone contact, the RRI 9 is announced to the customer 3, while in the case of Internet access, an Internet message may be sent to cause the customer's 3 Internet device to display the RRI 9.

An RRI 9 is communicated also to the vendor 1, for example by an e-mail message. Transmission of this message to the vendor 1, since it includes the transaction identifier 7, signals to the vendor that the customer 3 has confirmed the transaction, and also that a record of the customer's 3 spoken affirmation is available. The vendor 1 may then access the recording system 2 to retrieve the record from the Recording Archive 18.

In one embodiment, the recording system 2 presents an Internet web form wherein an e-mail address and an identifier 9 may be entered for the purpose of retrieving a record from the archive 18. Upon submission of a valid identifier, the recording system 2 then transmits to the designated recipient via e-mail 10 a data file, such as a wave file, containing the corresponding archived voice recording.

The software executed by the processor 12 of the recording system 2 to carry out the present invention can be divided into five modules.

The first module permits the creation and maintenance of vendor 1 records in the Vendor Database 14.

The second module implements the first phase by interpreting requests from vendors 1 for transaction identifiers 7 which, if successful, will result in entries being added to the Pending Transaction Database 15.

The third module implements the second phase by interpreting requests from vendors 1 to activate allocated transaction identifiers 7. The requests will include a transaction identifier 7. The module will then search the Pending Transaction Database 15 for a matching record. If a matching record is not found, then a notice of failure is transmitted to the vendor 1. Otherwise, the request is valid, the matching record in the Pending Transaction Database 15 is deleted and a corresponding new record created in the Transaction Database 16.

The fourth module implements the third and fourth phases. It will control the telephone interface 11 according to an interaction script such as the VoiceXML example illustrated in FIG. 10 and store voice records in the Recording Archive 18. It will then recite the RRI 9 to the customer 3. Finally, it will construct an e-mail or similar Internet message addressed to the vendor 1 containing the transaction identifier 7 and an RRI 9 in respect of the recording just made, and transmit this to the vendor 1.

The fifth module implements the fifth phase. It retrieves voice recordings from the Recording Archive 18 and transmits them to the requesting party via the Internet in response to the receipt of valid RRIs 9. It will receive submit messages from an HTML form 21 such as that depicted in FIG. 8, and extract from the form data the destination e-mail address and the RRI 9. It will look up the RRI 9 in the Recording Archive 18 and if unsuccessful will post an error message to the client web browser. If, however, a record is found in the Recording Archive 18 corresponding to the RRI 9 obtained from the HTML form, then it will compose an e-mail message containing the data in the retrieved record, attach the recording data as a MIME attachment to the e-mail, and transmit the e-mail to the e-mail address obtained from the HTML form.

The system described above admits certain alternative embodiments. It should be understood that these alternative embodiments are exemplary. It is contemplated that there are other methods and embodiments that are within the scope of the present invention. For example, a particular vendor 1 may be identified by means of a unique telephone number or contact point. In this case, the recording system 2 may be tailored specifically to the vendor 1. Alternatively, telephone technology may be introduced whereby the customer 3 can contact the recording system 2 by prefixing a special numeric sequence to the vendor's 1 telephone number, which the recording system 2 can then obtain using the Dialed Number Identification Service (DNIS) and use to obtain the identity of the vendor 1. In either case, the vendor could assume responsibility for ensuring the uniqueness of the transaction identifier 7 as well as associating it with a known customer 3. This would obviate the need for the first two phases of operation of the recording system 2 described above, as well as the Transaction Database 16 and the Pending Transaction Database 15. The recording system 2 would simply accept the transaction identifier 7 from the customer 3 and communicate it directly to the vendor 1 upon completion of the voice recording.

The transaction identifier 7 is required in the third phase so that the vendor 1 can identify the transaction and the customer 3. However, this may be done without providing the customer 3 with a unique identifier. For example, a vendor 1 may send an identical document to many different customers 3, identified by a number identifying only the document. The recording system 2 may easily be adapted to gather caller identification (telephonic networks provide a facility known as Automatic Number Identification or ANI, whereby the caller's telephone number is transmitted to the recipient of the call) so that a transaction may be uniquely identified without recourse to a Transaction Database 16 or a Pending Transaction Database 15. The recording system 2 simplified in this way could nevertheless take advantage of a Customer Database 17 to retain contact details for customers 3.

The recording method implemented by the recording system 2 described above could also be embodied by a human staff as opposed to a fully automated system without any essential change to the method of affirmation herein described. Likewise, an analog voice recording system could be employed in lieu of or in addition to the digital one described herein.

The recording method described above admits of several modifications. It should be understood that the described modifications are exemplary. It is contemplated that there are other methods and modifications that are within the scope of the present invention.

In the first place, a voice biometric mechanism may be used to check automatically whether the voice of the customer 3 matches a previously generated speech profile based on samples known to be authentic. (It is to be noted that the TradeHarbor Voice Signature Service performs this role in a similar context. However, it focuses entirely on the identity of the speaker and does not record evidence of informed consent.) In the field of interactive voice response systems, integration toolkits such as Veritel's VoiceCheck™ are widely used for such purposes. Using such verification mechanism, information on the closeness of the match between the live voice and a previously generated speech profile could then be relayed to the vendor 1 in addition to the RRI notification in the fourth phase. This profile could either be generated independently, and provided by the vendor 1 in the second phase, or generated by the recording system 2 itself by applying biometric analysis techniques to previous voice samples from the same customer 3. Examples of appropriate techniques are taught by Savic in "Variable Parameter Speaker Verification System Based on Hidden Markov Modeling", ICASSP '90, Acoustics, Speech and Signal Processing Conference, 1990; Farrell et al. in "Speaker Recognition Using Neural Networks and Conventional Classifiers," *IEEE Trans. on Speech and Audio Processing*, v. 2, n. 1, p. 11, pp. 194-205, January 1994; and Farrell in "Text-Dependent Speaker Verification Using Data Fusion," ICASSP-95, May 9-12, 1995, pp. 349-352.

Likewise, a continuous speech recognition system such as SoftSound, available from Autonomy Corporation of Cambridge, England, could be employed to verify the closeness of the oral affirmation to the text communicated to the customer 3 in the third phase. Gist recognition technology such as that developed by Autonomy Corporation could be used to compare the "gist" or meaning of the oral affirmation and of the original text and generate a similarity score. This could then be communicated to the vendor 1 with the RRI notification in the fourth phase. Again, a human operator could perform this speech recognition function.

A further modification to the proposed method and system would be a module supplied to the vendor 1 to archive the RRI notifications transmitted in the fourth phase (FIG. 4). This would essentially allow the vendor 1 to review and audit all contracts. It could be expanded to permit classifications (for example, by type of contract) and queries by customer, thus serving as both a contract management and customer contact archive. Because of the automatic and independent archival of formal acceptance declarations, such an archive would have exceptional value to an auditor.

The method and system of the present invention could also be configured to permit conference calls wherein one caller would act as witness to the identity of the principal affirming party 3. In this case, the recording system 2 could prompt the witness to record a subsequent affirmation to the effect that he or she verifies the identity of the first speaker. Or in another example, a governmental authority such as a Judge might merely declare his presence.

Future developments in Internet-based telephony will proliferate video telephone and videoconferencing peripherals. The current invention will easily admit of enhancement by adding concurrent video recording to the speech recording encompassed by the embodiment described above, either as a second, parallel recording or as a combined voice/video recording using industry-standard formats such as the MPEG family. Such a development could be further enhanced by the addition of a biometric facial recognition system such as the TrueFace® system available from eTrue, Inc. of Southboro, Mass., who supply a software toolkit for integration of facial recognition functions into existing applications software.

In summary, the present invention reverts to the fundamental principle behind an enforceable contract or solemn declaration, namely, the existence of forensic evidence of an individual's intent. It proposes a system and method for making a speech recording of intent, archiving this speech recording, and notifying and making it automatically available to interested parties.

Naturally, the method and system of the present invention is of broader application than to commercial vendor/customer contracts as described herein. For example, it may be applied to statutory declarations accompanying electronic tax payments. It can also be used for voting.

It is envisaged that this system will satisfy or obviate the need for a signature. The system and method proposed lend themselves both to postal and Internet contracts and declarations, but will be capable of contributing to the security and forensic admissibility of electronic commerce in the years to come.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the invention as claimed below.

What is claimed is:

1. A method for recording a solemn declaration, the method comprising:

receiving a transaction identifier at a recording system from a relying party via a first communications network, the transaction identifier identifying a transaction requiring a declaration from an affirming party;

associating the transaction identifier with the relying party at the recording system;

subsequently, receiving the transaction identifier at the recording system from the affirming party to associate the affirming party with the transaction, wherein the transaction identifier has been received by the affirming party prior to the recording system receiving the transaction identifier from the affirming party;

receiving a voice message at the recording system from the affirming party via a second communications network, the voice message including a statement of the declaration required from the affirming party, thereby providing an indication of completion of the transaction;

recording and storing the voice message at the recording system; and associating a recording identifier with the recorded voice message and the transaction identifier;

communicating the transaction identifier together with the recording identifier to the relying party via a third communications network in response to the indication of the completion of the transaction; and communicating the recording identifier to the affirming party via a fourth communications network in response to the indication of the completion of the transaction.

2. The method of claim 1 further comprising communicating the declaration identifier from the relying party to the affirming party prior to receiving the declaration identifier at the recording system from the affirming party.

3. The method of claim 1, wherein the first communications network, the second communications network, the third communications network, and the fourth communications network are the same communications network.

4. The method of claim 1, wherein the second communications network is a telecommunications network and wherein the first communications network, the third communications network, and the fourth communications network are different networks than the second communications network.

5. The method of claim 1, wherein the first communications network and the third communications network are the same network and wherein the second communications network and the fourth communications network are the same network.

6. The method of claim 1, further comprising:

receiving the recording identifier at the recording system after the completion of the transaction; and providing the recorded voice message in response to receiving the recording identifier.

7. The method of claim 1, wherein the transaction identifier is communicated by the relying party to the affirming party via a paper document.

8. The method of claim 1, wherein the transaction identifier is received at the recording system from the affirming party via a fifth communications network.

9. The method of claim 8, wherein the second communications network and the fifth communications network are the same network.

10. A computer readable medium for storing computer executable instructions for recording consent to a transaction using a voice recording system, said executable instructions comprising:

receiving a transaction identifier at the voice recording system from a relying party via a first communications network, the transaction identifier identifying a transaction requiring a declaration from an affirming party;

associating the transaction identifier with the relying party at the voice recording system;

subsequently, receiving the transaction identifier at the voice recording system from the affirming party to associate the affirming party with the transaction, wherein the transaction identifier has been received by the affirming party prior to the voice recording system receiving the transaction identifier from the affirming party;

receiving a voice message at the voice recording system from the affirming party via a second communications network, the voice message including a statement of the declaration required from the affirming party, thereby providing an indication of completion of the transaction;

recording and storing the voice message at the voice recording system;

associating a recording identifier with the recorded voice message and the transaction identifier;

communicating the transaction identifier together with the recording identifier to the relying party via a third communications network in response to the indication of the completion of the transaction; and communicating the recording identifier to the affirming party via a fourth communications network in response to the indication of the completion of the transaction.

11. The computer readable medium of claim 10, wherein the first communications network, the second communications network, the third communications network, and the fourth communications network are the same communications network.

12. The computer readable medium of claim 10, wherein the second communications network is a telecommunications network and wherein the first communications network, the third communications network, and the fourth communications network are different networks than the second communications network.

13. The computer readable medium of claim 10, wherein the first communications network and the third communications network are the same network and wherein the second communications network and the fourth communications network are the same network.

14. The computer readable medium of claim 10, said executable instructions further comprising:

receiving the recording identifier at the recording system after the completion of the transaction; and providing the recorded voice message in response to receiving the recording identifier.

15. The computer readable medium of claim 10, wherein the transaction identifier is communicated by the relying party to the affirming party via a paper document.

16. The computer readable medium of claim 10, wherein the transaction identifier is received at the recording system from the affirming party via a fifth communications network.

17. The computer readable medium of claim 16, wherein the second communications network and the fifth communications network are the same network.

* * * * *